UNITED STATES PATENT OFFICE.

ERNST H. RICHTER, OF TAUNTON, MASSACHUSETTS.

IMPROVEMENT IN FIRE-BRICKS.

Specification forming part of Letters Patent No. 150,485, dated May 5, 1874; application filed April 6, 1874.

*To all whom it may concern:*

Be it known that I, ERNST H. RICHTER, of Taunton, in the county of Bristol and State of Massachusetts, have invented a new and Improved Composition for Stove-Linings, Fire-Brick, &c., of which the following is a specification:

This invention has for its object to produce a composition for stove-linings, fire-brick, &c., which will resist the action of the fire for a long time, and may be easily and cheaply manufactured, and which will also resist the effects of atmospheric changes, such as hot, cold, dry, or moist temperature.

The invention consists in a composition of burnt mica and fire-clay, which are both cheap and readily-attainable substances, and which, when properly molded and burned, will form a strong and reliable compound. The proportions in which I prefer to mix these two substances are as follows: One hundred parts of fire-clay, and sixty parts of burnt mica. The mixture is combined with water, molded, and burned, the ingredients being pulverized before mixing.

By careful experiments I have found that, even when the proportions of the above-named ingredients are varied, a superior stove-lining or fire-brick will be produced; also, that soapstone may be added to the compound, if it is desired to make it more compact, in which case less mica is to be used. If it is desired to obtain greater porosity of the composition, oyster-shells may be substituted for part of the mica; or if the fire-brick, stove-lining, &c., is to be exposed to an unusual degree of heat, asbestus may be taken.

I wish it, however, to be understood that these three last-named substances—namely, soap-stone, oyster-shells, and asbestus—do not form a necessary part of my invention; but that the fire-brick, stove-lining, &c., composed of clay and burnt mica only, in about the proportions above given, will possess all the qualities which a good stove-lining, fire-brick, &c., must have when submitted to the ordinary usage.

I claim as my invention—

The stove-lining or fire-brick composed of fire-clay and burnt mica, as described.

ERNST H. RICHTER.

Witnesses:
G. E. WILLIAMS,
F. GUSTAV RICHTER.